Figure 1:
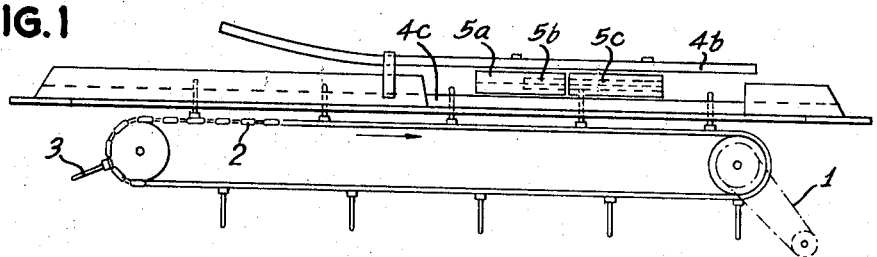

Oct. 31, 1967     V. INDRIKE     3,349,989

MANUFACTURE OF THERMOPLASTIC CONTAINERS

Filed Oct. 9, 1964     2 Sheets-Sheet 1

INVENTOR.
Viktor Indrike

BY James E. Bryan
ATTORNEY

Oct. 31, 1967 V. INDRIKE 3,349,989
MANUFACTURE OF THERMOPLASTIC CONTAINERS
Filed Oct. 9, 1964 2 Sheets-Sheet 2

INVENTOR.
Viktor Indrike
BY
James E. Bryan
ATTORNEY

United States Patent Office 3,349,989
Patented Oct. 31, 1967

3,349,989
MANUFACTURE OF THERMOPLASTIC
CONTAINERS
Viktor Indrike, Wiesbaden-Biebrich, Germany, assignor to Kalle Aktiengesellschaft, Wiesbaden-Biebrich, Germany
Filed Oct. 9, 1964, Ser. No. 402,869
Claims priority, application Germany, Apr. 1, 1964, K 52,548
1 Claim. (Cl. 229—44)

This invention relates to improvements in the manufacture of thermoplastic containers.

It is known to make, from plastic film, containers of which an upper part, for example a lid, and a lower part, for example a body, meet at flattened edges. The upper and lower parts of such containers are made either from a single piece of film, in which case they are connected by means of a groove to enable the two parts to be folded together, or they are separate components held together by edge clips, staples or other attachment means. To close the container firmly there are also used staples, rivets or the like, or the container is cemented, sealed or welded. However, these methods of closure are cumbersome. In use, such containers are impractical because in many cases a tool is required to open them or, when no tool is used, the container can often only be torn open, in an unsatisfactory manner. Moreover, once torn open, such containers cannot be closed again. The edge clips or other closing means used with two-part containers cannot be satisfactorily used as hinges and are expensive in material and labor.

The present invention provides a method of obtaining an advantageous attachment between the upper and lower parts of a container, made from a thermoplastic film, which parts meet at flattened edges. The invention also provides an apparatus for performing the method.

A repeatedly detachable means of attachment between the upper and lower parts of a container, which meet at flattened edges, can be achieved in a relatively simple manner when, at any part of the container at which such edges are required to be separably attached together, these edges are heated until the thermoplastic film is softened and then so rolled together that they are secured against casual separation while being separable when required. In the case of a container in two parts having straight edges at opposite sides and intended to be hinged at one side and separably attached at the other, one of the pairs of flattened edges may be softened and so rolled together that they are not normally detachable but can pivot with reference to one another, while the other pair is treated as set forth above.

The rolling should in all cases be performed by at least 180°. If the rolled-up double edge is to serve as a repeatedly openable closure, the edges are rolled up by at most 360°, preferably by about 270°. If the rolled-up double edge is to serve as a rolling hinge between the parts, the edges are advantageously rolled up by at least 360°. The rolling up is advantageously performed so that the finished outer roll has a diameter of a few mm., for example 3 to 8 mm.

Due to the two edges being rolled up together, the film which forms the outside of the roll has a slightly greater roll radius and is therefore in many cases rolled a little less tightly than the film edge forming the inside of the roll. The rolling angles given above apply to the more tightly rolled-up film.

By rolling up the edges of the parts together, with the rolling angles given above, very useful roll closures and roll hinges are obtained.

It is a particularly noteworthy feature that the roll closures made as described above form a very firm closure and yet can be opened without difficulty. It is another great advantage that the closure can be opened and closed again as often as required.

The closing means of the invention can be incorporated in all containers having a folding lid and made from rigid thermoplastic films, for example films of high-density polyethylene, polypropylene, polystyrene, cellulose acetate and polyvinyl chloride containing little or no plasticizer, the so-called hard polyvinyl chloride.

The rolling up of the pairs of edges may be performed with any suitable tool, such as a suitable wire hook guided along the heated edges. Of more advantage is a drawing device forming a narrow longitudinal channel commencing in a straight slot which gradually passes into a cylindrical bore. An example of this is described below.

Figure 2:
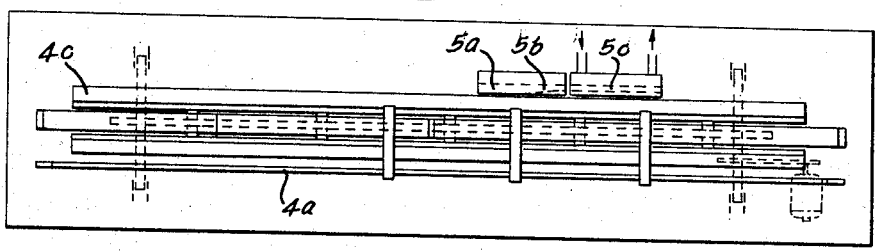
Figure 3:
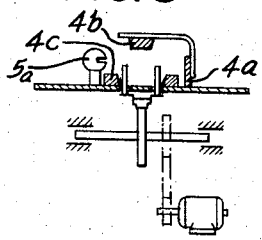
Figure 5:
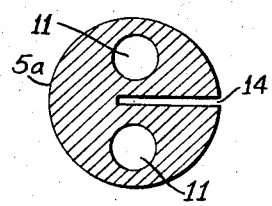
Figure 4:
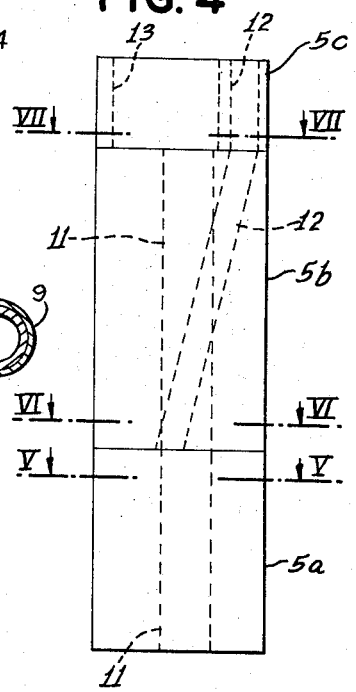
Figure 19:
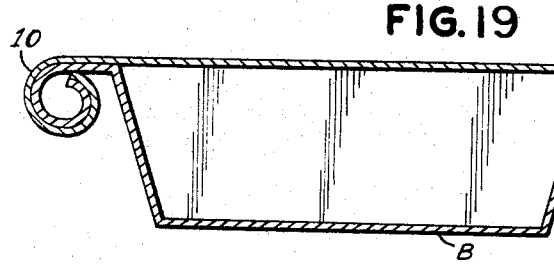
Figure 6:
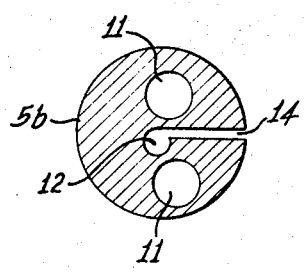
Figure 7:
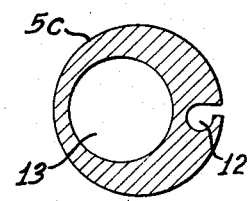
Figure 9:
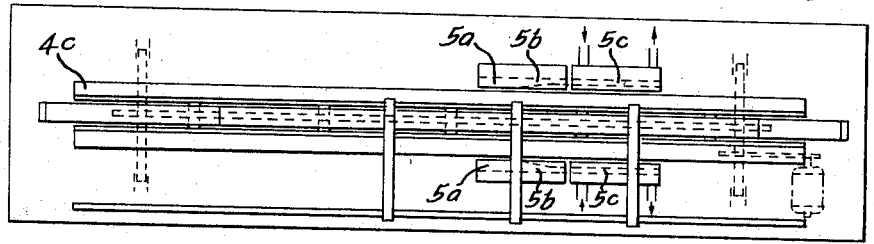
Figure 10:
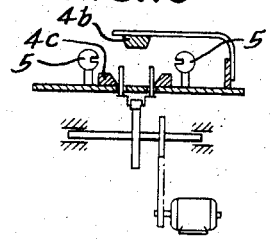
Figure 16:
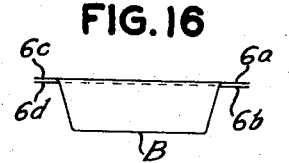
Figure 17:
Figure 11:
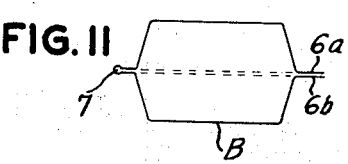
Figure 15:
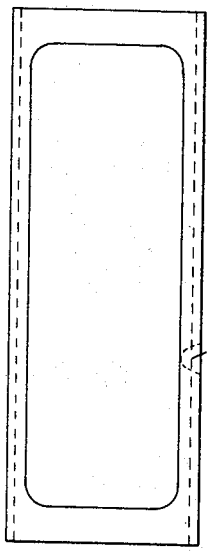
Figure 18:
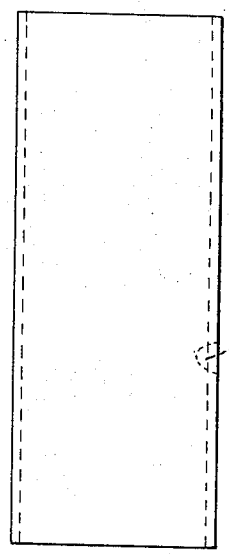
Figure 12:
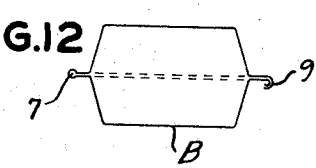
Figure 13:
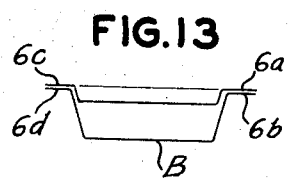
Figure 14:
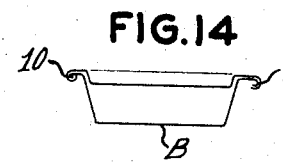

The apparatus of the invention is further illustrated in the accompanying drawings, in which:

FIGURES 1 to 3 show an apparatus for rolling up film edges, in side elevation, plan and end elevation respectively, FIGURE 4 is an elevation on a larger scale of part of the apparatus, and FIGS. 5 to 7 are sections on the lines V—V, VI—VI and VII—VII of FIG. 4, FIGURES 8 to 10 show an apparatus for making both roll closures and roll hinges according to the invention, in side elevation, plan and end elevation respectively, FIGURES 11 and 12 are cross-sections of a container before and after production of a roll closure respectively, FIGURES 13, 14, 16 and 17 are cross-sections of two different containers before and after making a roll closure and a roll hinge, FIGURES 15 and 18 are plan views of the containers as shown in FIGS. 14 and 17, and FIGURE 19 is an enlarged view of the container of FIGURE 17 showing the roll closure and roll hinge in detail.

Referring to the drawings, the devices represented in FIGS. 1 to 7 are used for rolling up together that portion of the edges 6a and 6b respectively, of the upper and lower parts of the container shown in cross-section in FIG. 11 which is intended to serve as a detachable closure. The container is in one piece and the parts are folded along a groove 7. FIG. 12 represents a cross-section through the container after the closure has been formed by rolling with the use of a continuously operating device. The device comprises an endless transport belt 2, which is driven by a drive 1, and is provided with projecting entraining elements 3. The containers are folded to bring together the edges to be rolled up, placed on the belt 2, and advanced by the elements 3. By the lateral registers 4a and 4c and an upper register 4b the container is kept tightly closed and it is thereby ensured that the elements 3 advance the containers in a straight line. The edges to be rolled up, 6a and 6b, first enter a heater unit 5a which consists of a metallic block having a straight slot 14 above and below which there are two heating channels 11. Heating means introduced into the heating channels 11, for example an electrical resistance, heats the block 5a to a temperature sufficient to ensure that the edges 6a and 6b to be rolled up, upon passing through the slot 14, are heated to such an extent that they are easy to shape and permanently retain their new shape after cooling. On the other hand, the temperature in the block 5a is kept sufficiently low to ensure that at their intended traveling speed the edges 6a and 6b on passing through the slot 14 are not welded together. The heat is advantageously controlled by a thermostat. After having been heated, the edges 6a and 6b reach a shaping section which consists of a block 5b which, like the block 5a, is provided with a slot and two bores which accommodate a heating means, and, if desired, with a further bore to receive a thermostat. In addition, the block 5b has a cylindrical bore 12 which is tangentially located with respect to the end of the slot 14, which continues inside the block 5b. The bore 12 has, however, an inclined position and thereby approaches the slot opening at the other end of the slot 14, whose width inside the block 5b is thereby diminished as the bore 12 approaches the slot opening. The diameter of the bore 12 depends on the desired size of the roll. Due to the inclined and tangential arrangement of the bore 12 with respect to the slot 14, the roll formed from the heated edges 6a and 6b, when the container passes the shaping device 5b, is automatically set according to the diameter of the bore 12. Depending on the degree of the gradual reduction of the slot 14 by the inclination of the bore 12, a roll 9 produced from the edges 6a and 6b becomes more or less tightly wound.

After the rolling, the edges 6a and 6b are allowed to cool. This is advantageously carried out with a cooler 5c which follows the shaping section 5b. It may have a bore 13 therein for accommodating a coolant.

Figure 8:
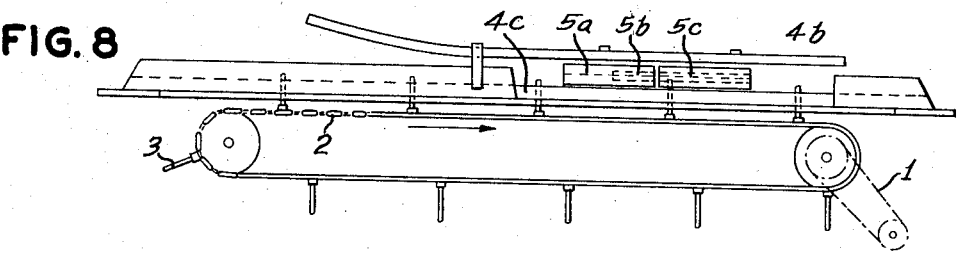

FIGS. 8 to 10 show an apparatus which can be used to simultaneously make a roll closure and a roll hinge on opposite sides of a container having originally separate upper and lower parts. Two examples of such two-part containers are shown in FIGS. 13 and 16. With such containers the edges 6a and 6b are made into a roll closure 9 and edges 6c and 6d are rolled up slightly more tightly to form a roll hinge 10 (FIGS. 14, 15, 17, 18, and 19). This two-sided rolling apparatus has, in contrast to a one-sided rolling apparatus, instead of the lateral register 4a a second shaping device 5 comprising a heater 5a, a shaping device 5b and a cooling section 5c.

To facilitate the opening of the container, that part of the container which is provided with an inside roll may have a recess 8 produced by cutting away, to enable a finger to be inserted for opening the box.

It will be obvious to those skilled in the art that many modifications may be made within the scope of the present invention without departing from the spirit thereof, and the invention includes all such modifications.

What is claimed is:

A container made of a thermoplastic material having separable edges on one side thereof rolled together more than 180° and less than 360° and edges on an opposite side rolled together by at least 360°, whereby the container may be opened using the latter edges as a roll hinge.

References Cited
UNITED STATES PATENTS

| | | | |
|---|---|---|---|
| 865,538 | 9/1907 | Smith | 220—79 |
| 2,289,747 | 7/1942 | Baker | 220—41 |
| 2,777,601 | 1/1957 | Cheeley | 229—5.6 |
| 2,998,158 | 8/1961 | Tupper | 150—.5 |
| 3,148,103 | 9/1964 | Gallagher | 150—.5 |
| 3,255,918 | 6/1966 | Bozek | 220—79 |

JOSEPH R. LECLAIR, *Primary Examiner.*